(12) United States Patent
Froger et al.

(10) Patent No.: US 6,293,144 B1
(45) Date of Patent: Sep. 25, 2001

(54) METHOD AND DEVICE FOR MONITORING THE CONSUMPTION OF A PRODUCT, FOR EXAMPLE A PRINTING INK, USING A LOW-PASS FILTER

(75) Inventors: Marie-Helene Froger, Chateaugiron; Pascal Coudray, La Chapelle des Fougeretz; Mickael Lorgeoux, Rennes, all of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/104,266

(22) Filed: Jun. 25, 1998

(30) Foreign Application Priority Data

Jun. 27, 1997 (FR) .................................................. 97 08131

(51) Int. Cl.$^7$ .......................... G01F 23/00; G01F 23/26; G08B 21/00
(52) U.S. Cl. ........................ 73/304 C; 702/52; 340/620; 361/284
(58) Field of Search ................................ 73/304 C, 1.73, 73/290 R; 324/712; 702/52; 340/618, 620; 361/284

(56) References Cited

U.S. PATENT DOCUMENTS

| Re. 34,601 | * | 5/1994 | Hochstein | 73/304 C |
|---|---|---|---|---|
| 2,280,678 | * | 4/1942 | Waymouth | 361/284 |
| 3,836,828 | * | 9/1974 | Siegel | 317/146 |
| 4,418,569 | | 12/1983 | Kuhnel | 73/304 |
| 4,628,951 | * | 12/1986 | Higgins et al. | 137/2 |
| 5,005,049 | * | 4/1991 | Hochstein | 73/304 C |
| 5,051,921 | * | 9/1991 | Paglione | 364/509 |
| 5,465,619 | * | 11/1995 | Sotack et al. | 73/304 C |

FOREIGN PATENT DOCUMENTS

| 28399 | 5/1981 | (EP) . |
|---|---|---|
| 90/13797 | 11/1990 | (WO) . |

\* cited by examiner

*Primary Examiner*—Hezron Williams
*Assistant Examiner*—Dennis Loo
(74) *Attorney, Agent, or Firm*—Fitzpatrick, Cella, Harper & Scinto (57) ABSTRACT

In order to monitor the consumption of a normally electrically conductive product contained in a storage chamber of a reservoir made of electrically non-conductive material, the storage chamber is disposed in a capacitive arrangement and a measurement procedure is defined, according to which, in response to an excitation signal applied to the capacitive arrangement, a measurement signal is obtained (at 122), one characteristic of which has an amplitude which varies substantially with the quantity of product contained in the storage chamber. Before deducing the value of information representing the quantity of product available in the reservoir from this amplitude, the measurement signal has filtering applied to it, according to which it is multiplied by a reference signal of frequency at least approximately equal to that of the excitation signal (at 121) and the multiplied signal is applied to a low-pass filter.

24 Claims, 7 Drawing Sheets

METHOD AND DEVICE FOR MONITORING THE CONSUMPTION OF A PRODUCT, FOR EXAMPLE A PRINTING INK, USING A LOW-PASS FILTER

The invention concerns the monitoring of the consumption of a normally electrically conductive product contained in a reservoir made of electrically non-conductive material. It applies notably, but not exclusively, to the monitoring of the consumption of a marking product in an image forming device, for example that of an ink in a printing device.

The principal aim of monitoring the consumption of product is to be able to inform the user of the equipment including the reservoir about the residual quantity of product it has available: in that way the user can estimate in advance the moment to replace the reservoir, and secondarily the moment to obtain a replacement reservoir to do this.

This monitoring is notably useful in printing devices: ink level detection is then commonly referred to.

Various methods of ink level detection in devices using ink-jet technology are already known.

In particular, the document EP-A2-0 028 399 describes a method of detecting a minimum ink level in a reservoir which uses a resonating resonant circuit, the capacitance of which is formed by two metal plates between which the ink reservoir is located. This ink behaves as a dielectric whose value changes as the ink level decreases; likewise the capacitance of the resonant circuit changes with this ink level. It is indicated that this resonant circuit is calibrated so that its resonant frequency, and therefore the maximum level of voltage at its resistance, is achieved when the ink level has fallen to a predetermined minimum level, for example equal to 20%. When crossing of this threshold is detected, an optical or acoustic signal is emitted.

Detection of a given threshold of ink appears to correspond to detection of the crossing of a voltage threshold for the frequency which has been defined beforehand as being the resonant frequency for the quantity of residual ink it is being attempted to detect.

It must be noted that this method is of the all or nothing type, depending on whether the threshold has been crossed or not, and is not concerned with monitoring the quantity of ink prior to the crossing of this threshold.

In fact it must be noted that, the smaller the quantity of ink defining the capacitance, the smaller the voltage peak, in consequence of which this voltage peak is all the more difficult to detect since it corresponds to a small quantity of residual ink in the reservoir. This is doubtless one of the reasons which explains why this document provides for a minimum threshold as high as 20%.

Moreover, the crossing of the voltage threshold by the electrical signal which is detected appeared to correspond to quite scattered values of the quantity of residual ink actually available in the reservoir. This is doubtless another reason for which the manufacturers of printing equipment choose substantial safety margins in their indications of a "zero" level of residual ink which is supposed to lead the user to replace the reservoir.

One consequence of the choice of so high a safety margin is that, in order to guarantee that the user will not be prematurely short of ink, the reservoir is discarded while there is sometimes still an appreciable quantity of useable ink remaining.

The same situation is found more generally in relation to reservoirs containing a marking product, whether ink or not, and more generally in relation to reservoirs made of an electrically non-conductive material containing a product which is electrically conductive, and therefore able to be integrated into a capacitive arrangement.

One reason for the aforementioned scatter certainly lies in the existence of noise which is added to the measurement signal. Such noise is notably to be feared in the presence of sources of sizeable electromagnetic waves situated in proximity to the reservoir, or when mounting or mechanical configuration requirements do not allow the plates to be placed in sufficient proximity to the reservoir, which increases the sensitivity of the measurements with regard to the environment.

The object of the invention is to overcome the aforementioned drawbacks by allowing continuous monitoring of the consumption of a product contained in a reservoir, combined with an improved accuracy as regards detection of the moment when the residual quantity of this product crosses a minimum threshold, with the consequence of allowing, with complete security for the user, a lowering of this threshold and therefore a fuller use of the product contained in the reservoir before the latter is discarded. The invention aims to achieve this object without a modification of the reservoir being necessary (such a modification is of course possible while remaining within the scope of the invention).

More particularly, the invention aims to reduce the noise liable to spoil the accuracy of the measurements, simply and reliably, but without resulting in any notable cost. It aims in effect to be able to achieve the aforementioned objects within the context of mass production.

To that end the invention applies to a method of monitoring the consumption of an electrically conductive product contained in a reservoir made of an electrically non-conductive material having a storage chamber connected to one end of a product output channel, according to which the storage chamber is disposed in a capacitive arrangement;

a measurement procedure is defined, having an excitation step consisting of applying an electrical excitation signal to that capacitive arrangement and an acquisition step consisting of taking an output signal from that capacitive arrangement and of supplying a measurement signal, this electrical excitation signal having a frequency chosen so that this measurement signal has a characteristic whose amplitude varies substantially with the quantity of product contained in that chamber;

a filtering procedure is defined, having a step of multiplying the measurement signal by a reference signal having a frequency at least approximately equal to the frequency of the electrical excitation signal, and the multiplied signal is applied to a low-pass filter with cut-off frequency greater than the difference between the frequencies of the excitation signal and the reference signal, so as to obtain a filtered signal;

a processing procedure is defined, having an identification step consisting of determining, in the filtered signal, the value of the amplitude of a characteristic of the same kind as the said characteristic of the measurement signal, and a conversion step consisting of deducing the value of information representing the quantity of product available in the reservoir from the said value of this amplitude; and at least one measurement cycle is carried out, having steps consisting of monitoring the measurement procedure, the filtering procedure and the processing procedure and of acquiring the instantaneous value of the said information.

It must be noted here that the product of two periodic, notably sinusoidal, terms, is the sum of a first term whose frequency is the difference between the frequencies of the multiplied terms and a second term whose frequency is the sum of these frequencies. If the two terms have substantially the same frequency, the result of this is that the signal obtained by multiplication has a term with a substantially zero frequency and a term whose frequency is twice the common frequency of the original terms: by filtering this obtained signal with a simple low-pass filter, a signal substantially cleared of its noise components whose frequency is different from the frequency of the original terms can therefore be obtained. Such a multiplication is here without any consequence which interferes with the remainder of the processing, since the concern here is with an amplitude of the measurement signal and this amplitude is located, except for a multiplying factor defined by the chosen reference signal, in the filtered signal.

Preferentially, the capacitive arrangement is formed by disposing the said storage chamber between two electrically conductive plates, the excitation step consisting of applying the excitation signal to one of these plates, and the acquisition step consisting of taking the output signal from the other of these plates. Advantageously, the other end of the output channel is connected to a predetermined potential, which may quite simply be that of earth: this provides some stability to the measurement signal, and above all makes it possible to detect an absence of product in the output channel (it must be noted here that it is already conventional for a print head to be connected to earth, for reasons independent of monitoring ink consumption).

The measurement signal quantity whose amplitude is measured is preferably voltage, which is a quantity whose method of detection and processing is well known.

It is clear that the simplest way of generating the reference signal is to take the electrical excitation signal, except for a possible multiplying factor.

When the reservoir is intended to be integrated into equipment having an electrical power supply intended to be connected to a local mains supply, the low-pass filter preferably has a cut-off frequency below the frequency of this local mains (most often 50 Hz in Europe) so as to eliminate the noise components, generally sizeable, which are generated by equipment connected to this mains, at the harmonic frequencies of the mains.

Preferentially, when the product is a marking product and the reservoir is intended to be integrated into an image forming device, the choice of a frequency of the electrical excitation signal at least of the order of a megahertz leads to making the amplitude of the measurement signal sensitive to the quantity of product in the storage chamber.

Of course, the invention applies most especially where the product is a printing ink and the reservoir is intended to be integrated into a printing device, in which case the frequency of the electrical excitation signal is advantageously of the order of 5 MHz.

The invention also proposes, for implementation of the aforementioned method, a device for monitoring the consumption of an electrically conductive product contained in a reservoir made of an electrically non-conductive material having a storage chamber connected to one end of a product output channel, having means intended to form, with the said storage chamber, a capacitive arrangement;

excitation means for applying an electrical excitation signal to this capacitive arrangement and measurement means for taking an output signal from this capacitive arrangement and supplying a measurement signal, this electrical excitation signal having a frequency chosen so that this measurement signal has a characteristic whose amplitude varies substantially with the quantity of product contained in this chamber;

filtering means having means for multiplying the measurement signal by a reference signal having a frequency at least approximately equal to the frequency of the electrical excitation signal, and a low-pass filter with cut-off frequency greater than the difference between the frequencies of the excitation signal and the reference signal, this low-pass filter being connected to the output of the multiplication means and delivering a filtered signal; and processing means designed so as to determine, in the filtered signal, the value of the amplitude of a characteristic of the same kind as the said characteristic of the measurement signal, and to deduce the value of information representing the quantity of product available in the reservoir chamber from the said value of this amplitude.

This device advantageously has the elements allowing implementation of the preferred features indicated above in relation to the method.

Thus, preferentially, the capacitive arrangement has two electrically conductive plates defining a location intended to receive the reservoir chamber, one of these plates being connected to the excitation means and the other plate being connected to the measurement means; furthermore, means are advantageously provided to connect the other end of the output channel to a predetermined potential, such as that of earth.

The invention also concerns a product supply device having a reservoir made of electrically non-conductive material having a storage chamber containing an electrically conductive product and a consumption monitoring device of the aforementioned type. It is preferably an image forming device, such as in particular a printing device.

Objects, characteristics and advantages of the invention emerge from the description which follows, given by way of a non-limitative illustrative example with reference to the accompanying drawings in which.

Generally speaking, the invention implements a capacitive arrangement using two metal plates on either side of a cartridge or reservoir made of plastic (and therefore electrically non-conductive) containing a conductive ink, the whole forming a capacitor, and preferably using the connecting duct from the reservoir to the print head as an electrical switch between the said reservoir and the equivalent impedance between the said print head and earth.

The reservoir made of non-conductive material containing the ink behaves as a dielectric whose capacitance is formed by these two plates.

The ink behaves as an electrical conductor between the reservoir and the impedance of the print head.

The invention consists of generating a periodic signal, preferably sinusoidal, on one of the plates and of taking the voltage from the second plate, this voltage representing both the quantity of ink contained in the reservoir and the presence of ink in the duct connecting the said reservoir and the print head. The invention also consists of using an analogue multiplier and carrying out the multiplication of the signal on the first plate (or any reference signal having a frequency at least approximately equal to the frequency of this excitation signal) by the signal on the second, and finally of filtering the resulting signal by means of a low-pass filter.

Figure 1:
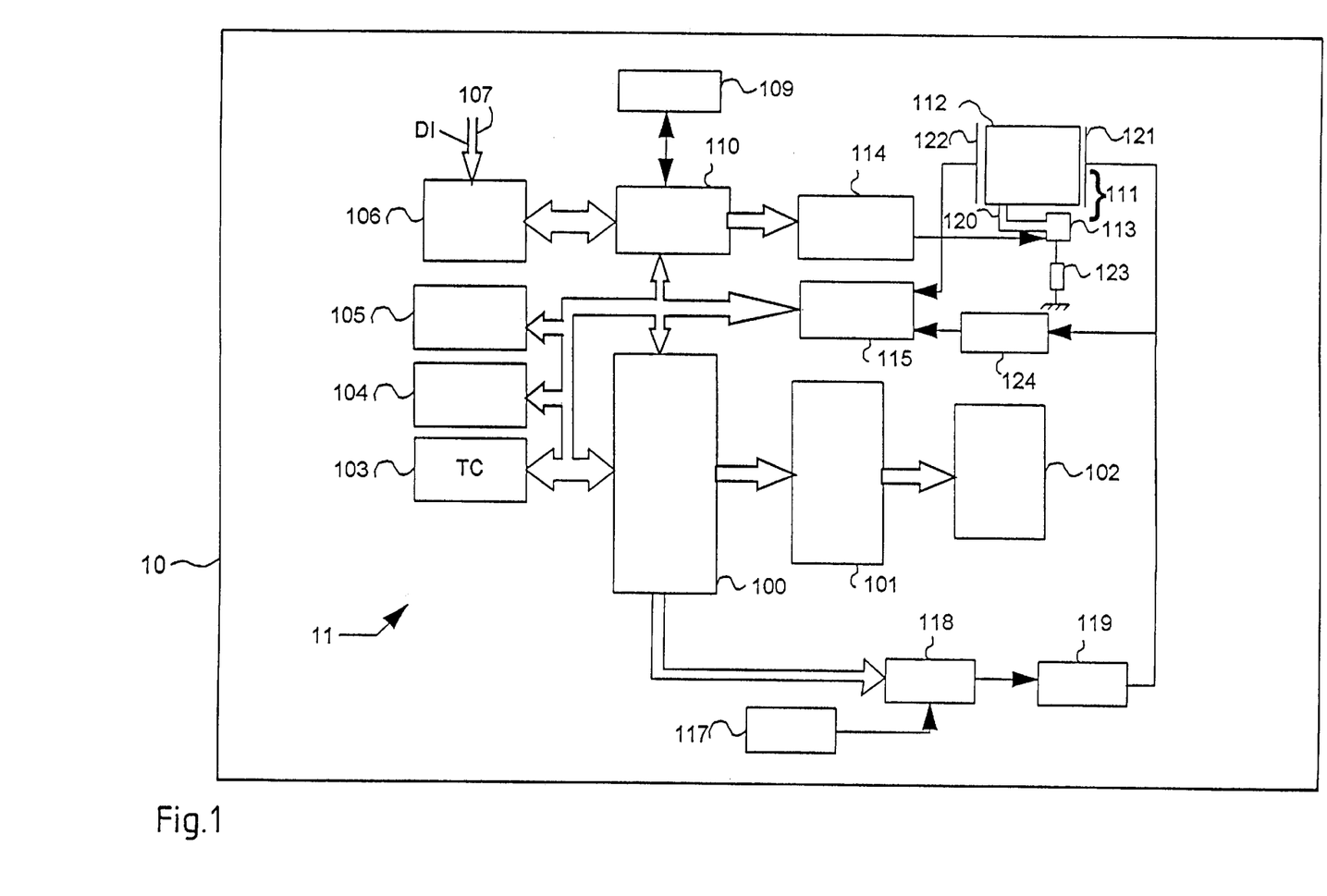
FIG. 1 is a block diagram of a printing device in accordance with the invention.

The invention is described in relation to an image transfer device 11, for example included in a printer 10, which receives data to be printed DI by means of a parallel input/output port 107 connected to an interface circuit 106. The circuit 106 is connected to an ink ejection control circuit 110 which controls an ink cartridge 111, via an amplification circuit 114.

The ink cartridge 111 is exchangeable and is mounted on a carriage with reciprocating translational motion driven by a motor 102.

The ink cartridge comprises essentially an ink reservoir 112, and a duct 120 connecting the reservoir and the print head 113. This print head 113 creates an impedance between the ink and earth.

The printer also has a main data processing circuit 100, associated with a read-only memory 103 and a random access memory 109. The read-only memory 103 contains the operating programs for the main processing circuit 100, while the random access memory 109, also associated with the ink ejection control circuit 110, temporarily stores the data DI received by means of the interface 106 as well as the data processed by the main processing circuit 100.

The main processing circuit 100 is connected to a display 104 on which the main processing circuit 100 controls the display of messages representing the operation of the printer. The main circuit 100 is connected to a keypad 105 having at least one switch by means of which the user can transmit operating commands to the printer.

The processing circuit 100 is also connected to the motor 102 by means of an amplification circuit 101. The motor 102 provides the movement of the carriage which carries the print cartridge 111. The motor 102 is for example a stepping motor. The printer described previously is conventional and well known to persons skilled in the art. It will therefore not be detailed further.

Thus, according to the invention, the printer has two metallic plates 122 and 121 fixed at the outside of the plastic reservoir containing the conductive ink, the whole making a capacitor.

The printer includes a means for supplying the metallic element 121 with an alternating signal supplied by an oscillator 117 via a selector 118 selecting the oscillator or earth, and an amplifier 119.

The printer also includes a means 115 for converting the electrical signals from the plates 121 and 122 into a signal representing the level of ink or a signal representing the noise. An attenuation means 124 of any appropriate known type is provided between the elements 121 and 115, so as to apply, to the circuit 115, a signal of the same frequency as the signal applied to the plate 121, but with a calibrated amplitude, for example equal to 1 volt.

The main processing circuit 100 is connected to the switch 118 to control it and thus select transmission of the alternating signal between the oscillator or earth and the metallic element 121 constituting one of the faces of the capacitor.

The metallic receiving element 122 is connected to a conversion circuit 115, itself connected to the main processing circuit 100. This metallic element 122 constituting the second face of the capacitor with the cartridge as dielectric.

The element 122 is connected, like the element 121, to the conversion circuit 115 which in response supplies a digital signal SN to the main processing circuit 100.

Figure 2:
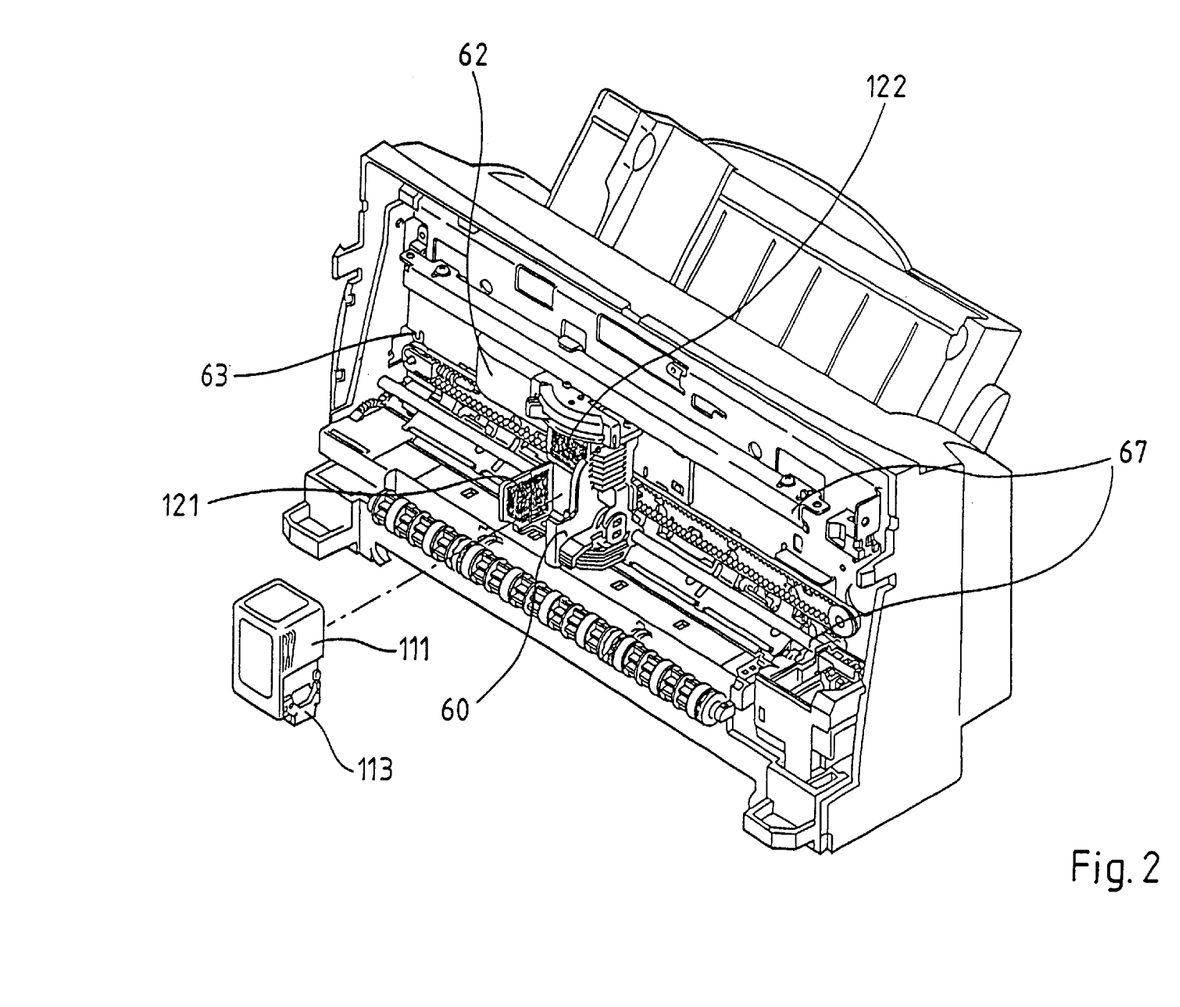
FIG. 2 is a simplified perspective view of this printing device.

As shown in FIG. 2, the printing device conventionally includes a carriage 60 to carry the print cartridge 111. The carriage is driven in reciprocating motion on a movement path formed by guide rails 67. The motor drives the carriage 60 by means of a belt device 63.

The movement path of the print head 113 is parallel to a line on a print medium, not depicted, such as a sheet of paper. A flexible cable 62 connects the amplification circuit 114 to the cartridge 111, the amplifier 119 to the metallic element 121 and the element 122 to the detection circuit 115.

Figure 3:
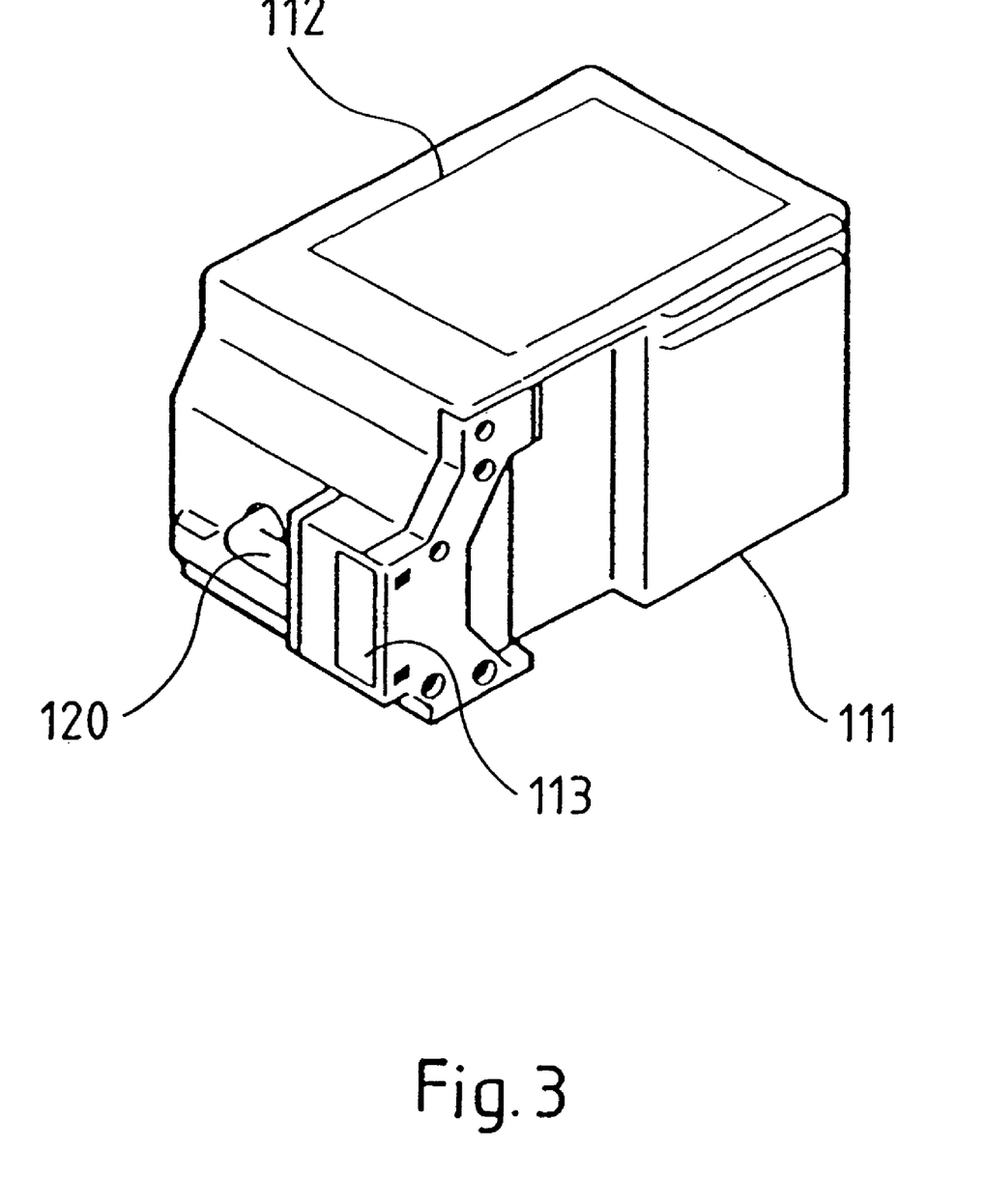
FIG. 3 is a schematic perspective view of a reservoir of this printing device.

FIG. 3 is a view of the ink cartridge 111. The reservoir part 112, the connecting duct 120 connecting the said reservoir to the print head and finally the print head 113 can be seen.

Figure 4:
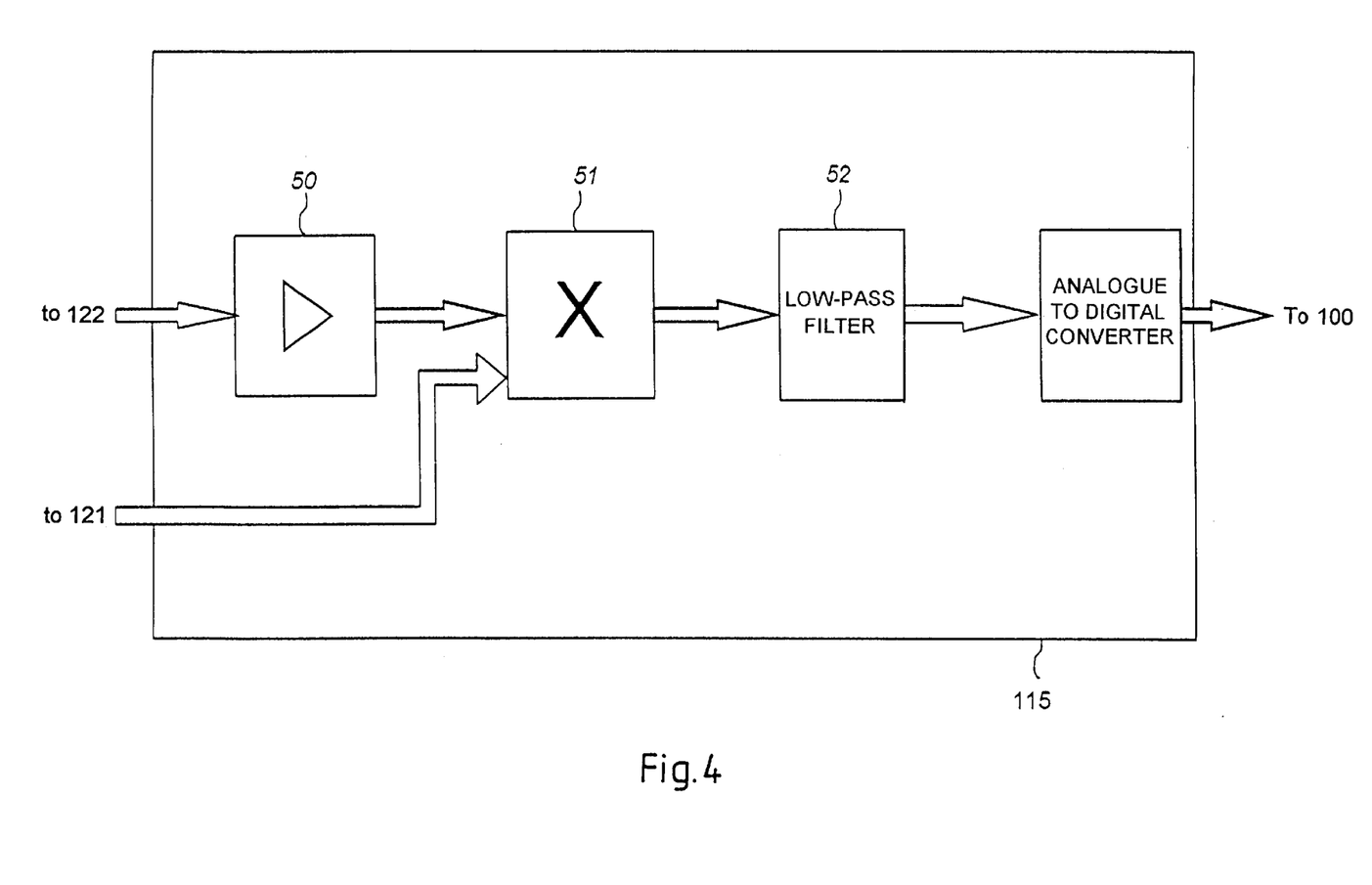
FIG. 4 is a block diagram of the filtering device of this printing device.

FIG. 4 depicts the block diagram of the means 115 converting the electrical signal from the plate 122 and that from the attenuation means 124 into a signal representing the ink level and/or the presence of ink in the connecting duct 120.

The metallic element 122 is connected to an amplifier 50 with input impedance 300 K$\Omega$ and 1.5 pF. This amplifier has a gain of 1 and essentially serves as an interface circuit between the metal plate and the multiplier.

This amplifier 50 is connected to the analogue multiplier which will multiply the output signal 50 by the signal applied to the metallic plate 121.

This multiplication essentially achieves the following function $$(A \sin w0t) \times (B \sin w0t) = AB/2(Sin(w0t-w0t)+Sin(w0t+w0t))$$

This therefore has the effect of transposing the resulting signal frequency-wise: a d.c. component and a component at 2f2 are obtained.

The d.c. component suffices to obtain the useful information on the residual quantity of ink. A simple low-pass filter makes it possible to remove the external noise. In effect, it is then possible with a low-pass filter 52 whose cut-off frequency is of the order of 10 Hz, of a second order for example, to attenuate all the external interference.

By way of example, this filter attenuates a signal at 100 Hz by 40 dB. Therefore, if the oscillator 117 supplies a sinusoid at 5 MHz, the equivalent of a band-pass filter centred on 5 MHz and with pass band equal to a few tens of hertz has thus been achieved with the multiplier 51 and the filter 52, but for a very much lower cost.

Finally, the resulting signal is converted into a digital signal by virtue of the analogue to digital converter 53, a signal which can be interpreted by the CPU 100.

Figure 5:
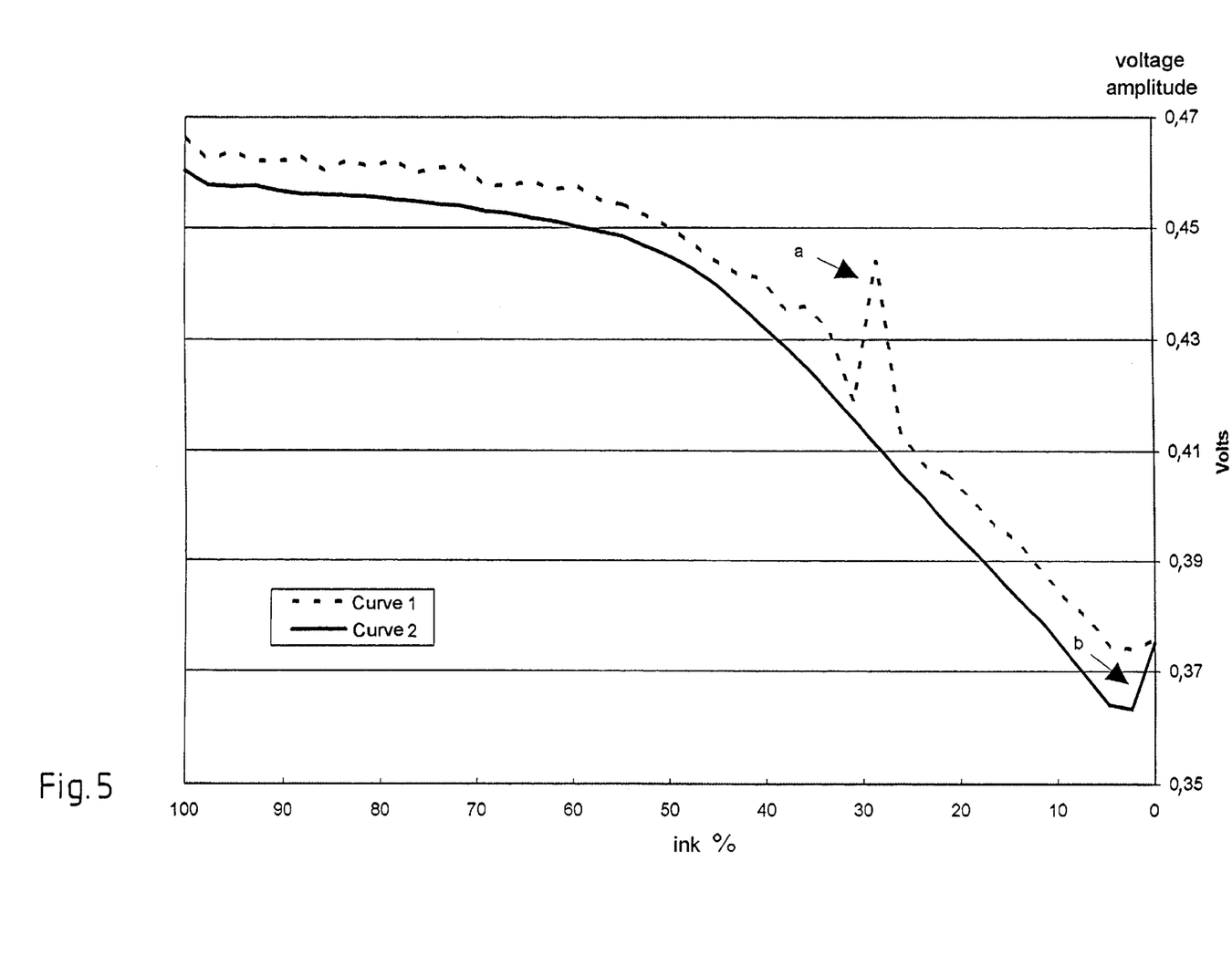
FIG. 5 is a graph showing the curves obtained before and after filtering in relation to the correlation between the value of the measurement signal amplitude and the percentage of ink still available in the storage chamber.

FIG. 5 depicts experimental curves showing the results obtained by the invention. On the X-axis, the quantity of ink contained in the reservoir is expressed as a percentage of the maximum quantity. The voltage of the electrical signal Si, expressed in volts, at the metallic element 122 is on the Y-axis.

The curve 1 represents the amplitude of the signal at the input of the multiplier. In this example, this contains both the signal containing the information relating to the quantity of ink in the reservoir and the ambient electromagnetic noise.

This noise is proportionally greater when the ink level is low since the amplitude of the signal received on the plate 122 decreases as the quantity of ink decreases. At a on the curve 1, a voltage peak may be noted: this corresponds to the localised presence of an external noise source.

The curve 2 corresponds to the amplitude of the signal at the output of the low-pass filter 52. This now contains only the information relating to the ink level. With all noise having disappeared, a sudden rise of the signal is noted at b on the curve 2. This corresponds to the absence of ink in the channel 20 connecting the reservoir to the print head 113.

This is because, when the ink runs out in the channel, no electrical connection (a connection previously provided by the conductive ink) exists, the ink contained in the reservoir no longer at that instant being connected to a predetermined potential by means of the print head.

Figure 6:
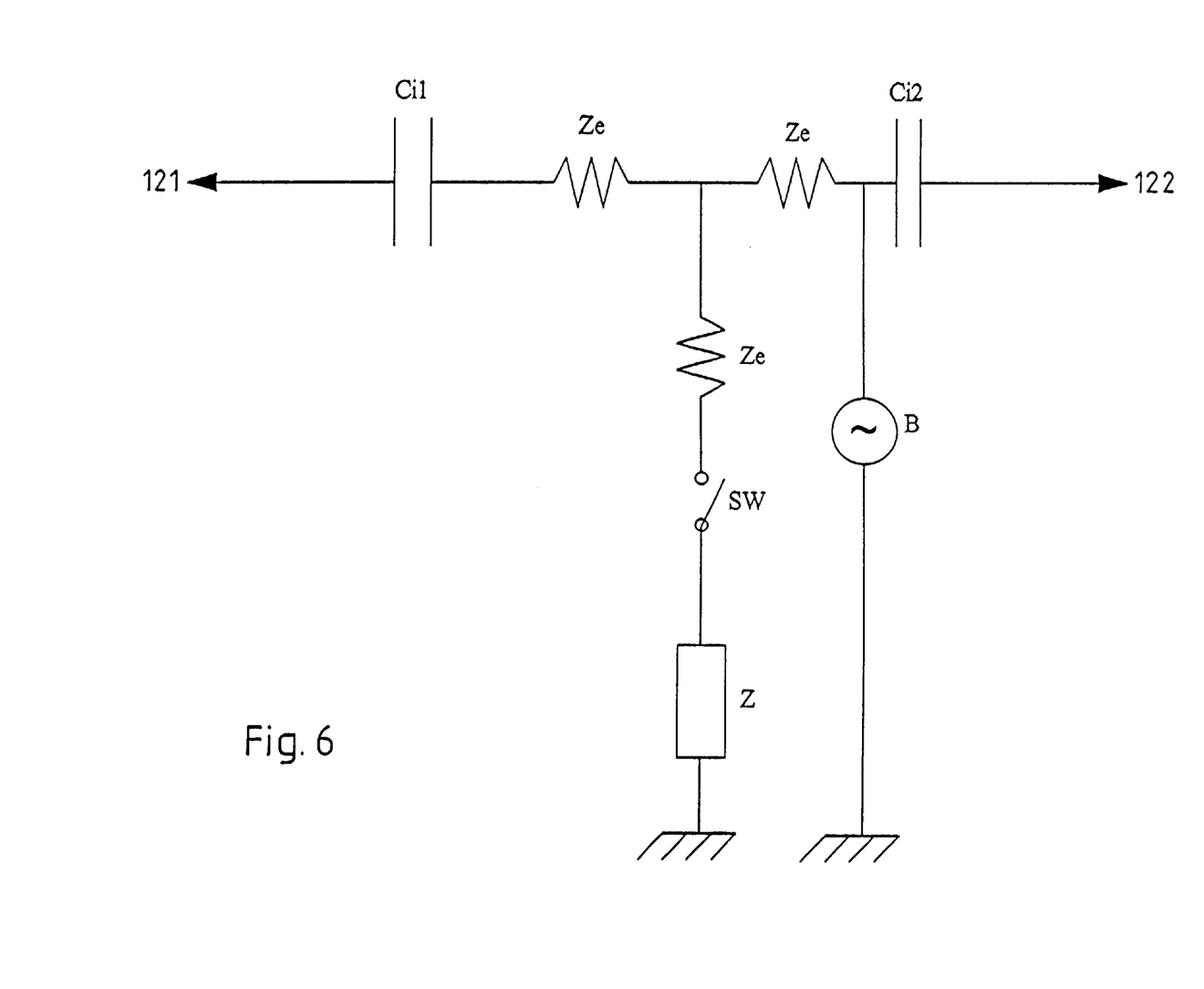
FIG. 6 is a diagram depicting the capacitive arrangement of which the chamber forms part.

FIG. 6 depicts the equivalent electrical diagram of the phenomenon:

$Ci1$: represents the capacitance constituted by the metallic element 121, the wall of the reservoir 112 and the ink.

$Ze$: represents the equivalent impedance of the ink which may be both resistive and capacitive.

$Ci2$: represents the capacitance constituted by the metallic element 122, the wall of the reservoir 112 and the ink.

$Sw$: represents the ink present or absent in the duct 120. This is represented in the form of a switch which is open or closed depending on the absence or presence of ink.

$Z$: represents the impedance between the ink contained in the print head and the system earth.

The oscillator is connected to the element 121 and, when the quantity of ink decreases, the capacitances $Ci1$ and $Ci2$ decrease, the impedance $Ze$ increases substantially and the voltage 122 decreases. When the ink runs out in the duct, this acts as a switch, then causing a sudden rise of the electrical signal on the element 122.

$B$: represents the amount of noise considered as a pseudo-random signal.

An algorithm of the invention is stored in the read-only memory 103 of the printing device. As shown schematically in FIG. 7, this algorithm comprises steps which are passed through periodically, for example before the printing of a document. The algorithm determines the quantity of ink in the reservoir 112.

Figure 7:
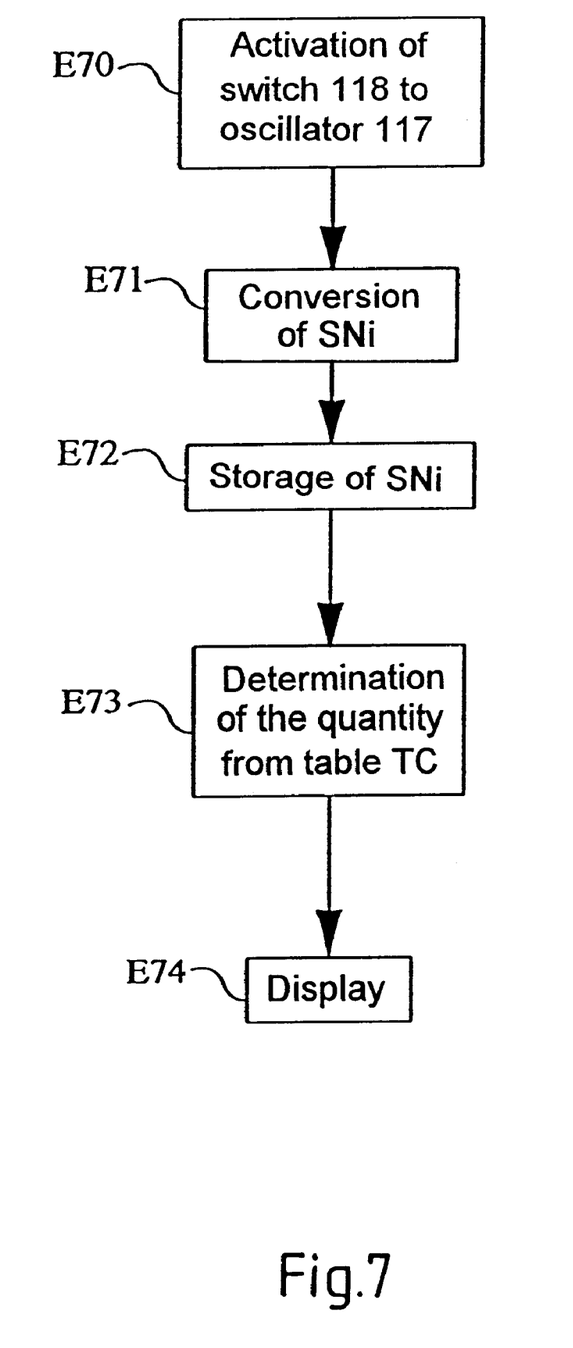
FIG. 7 is a flow diagram of the program residing in read-only memory for implementation of the invention.

The step E70 consists of positioning the switch 118 to allow the passage of the signal generated by the oscillator 117 to the amplifier 119 so that the metallic element 121 is supplied by the excitation signal SE.

At the step E71, the signal Si is converted into digital information. This information SNi is stored in the RAM 109 at the step E72.

At the step E73, the Central Unit finally determines the quantity of ink with the table TC and, at the step E74, displays the result.

As a variant, the value of the ink level is transmitted to a remote device such as a microcomputer by means of a "Centronics" type interface.

It is self-evident that the preceding description has been given only by way of a non-limitative illustration and that variants can be envisaged without departing from the scope of the invention. Thus, for example, the invention applies to the case where the excitation signal is applied to the multiplier after amplification, or reduction, depending on which may appear useful; likewise the reference signal by which the measurement signal is multiplied might not be deduced from the excitation signal, and be generated independently; it can then be allowed that its frequency might not be strictly equal to the excitation frequency (the frequency difference must however remain moderate since it constitutes a minimum for the cut-off frequency of the low-pass filter and therefore of the interference bandwidth which will be retained.

What is claimed is:

1. A method of monitoring the consumption of a normally electrically conductive product contained in a reservoir made of an electrically non-conductive material having a storage chamber for containing the product and having an output channel for the product, in which the storage chamber is disposed in a capacitive arrangement, said method comprising the steps of:

defining a measurement procedure having an excitation step of applying an electrical excitation signal to the capacitive arrangement and an acquisition step of taking an output signal from the capacitive arrangement and of supplying a measurement signal, this electrical excitation signal having a frequency chosen so that this measurement signal has a characteristic whose amplitude varies substantially with the quantity of product contained in the storage chamber;

defining a filtering procedure having a step of multiplying the measurement signal by a reference signal having a frequency at least approximately equal to the frequency of the electrical excitation signal, and applying the multiplied signal to a low-pass filter with a cut-off frequency greater than the difference between the frequencies of the excitation signal and of the reference signal, so as to obtain a filtered signal;

defining a processing procedure having an identification step of determining, in the filtered signal, the value of the amplitude of a characteristic of the same kind as the said characteristic of the measurement signal, and a conversion step of deducing the value of an information representing the quantity of product available in the reservoir from the said value of this amplitude; and carrying out at least one measurement cycle having steps of monitoring the measurement procedure, the filtering procedure and the processing procedure and of acquiring an instantaneous value of the said information.

2. A method according to claim 1, comprising disposing the storage chamber between two electrically conductive plates forming part of the capacitive arrangement, the excitation step comprising applying the excitation signal to one of these plates, and the acquisition step comprising taking the output signal from the other one of these plates.

3. A method according to claim 2, comprising connecting one end of an output channel for the product to the storage chamber and another end of the output channel to a predetermined potential.

4. A method according to claim 3, wherein the predetermined potential is that of earth.

5. A method according to claim 1, wherein the characteristic whose amplitude varies with the quantity of product contained in the chamber is the voltage.

6. A method according to claim 1, wherein the reference signal is constituted by the electrical excitation signal, except for a possible multiplying factor.

7. A method according to claim 1, wherein the reservoir is adapted to be integrated into an equipment having an electrical power supply intended to be connected to a local mains supply, and the low-pass filter has a cut-off frequency below the frequency of this local mains.

8. A method according to claim 1, wherein the product is a marking product, the reservoir is adapted to be integrated into an image forming device, and the frequency of the electrical excitation signal is at least of the order of a megahertz.

9. A method according to claim 8, wherein the product is a printing ink and the reservoir is adapted to be integrated into a printing device.

10. A method according to claim 9, wherein the frequency of the electrical excitation signal is of the order of 5 MHz.

11. A device for monitoring the consumption of an electrically conductive product contained in a reservoir made of an electrically non-conductive material comprising a storage chamber and means for forming, with the storage chamber, a capacitive arrangement further comprising:

excitation means for applying an electrical excitation signal to this capacitive arrangement and measurement means for taking an output signal from this capacitive arrangement and supplying a measurement signal, this electrical excitation signal having a frequency chosen so that this measurement signal has a characteristic whose amplitude varies substantially with the quantity of product contained in this chamber;

filtering means having means for multiplying the measurement signal by a reference signal having a frequency at least approximately equal to the frequency of the electrical excitation signal, and a low-pass filter with a cut-off frequency greater than the difference between the frequencies of the excitation signal and the reference signal, this low-pass filter being connected to an output of the multiplication means and delivering a filtered signal; and processing means designed so as to determine, in the filtered signal, the value of the amplitude of a characteristic of the same kind as the said characteristic of the measurement signal, and to deduce the value of an information representing the quantity of product available in the reservoir chamber from the said value of this amplitude.

12. A device according to claim 11, wherein the capacitive arrangement comprises two electrically conductive plates defining a location adapted to receive the storage chamber, one of these plates being connected to the excitation means and the other plate being connected to the measurement means.

13. A device according to claim 12, comprising an output channel for the product comprising an end connected to the storage chamber and wherein the capacitive arrangement further comprises means to connect another end of the output channel to a predetermined potential.

14. A device according to claim 13, the predetermined potential is that of earth.

15. A device according to claim 11, wherein the characteristic whose amplitude varies with the quantity of product contained in the storage chamber is the voltage, and the processing means are designed so as to detect the amplitude of the voltage of the filtered signal.

16. A device according claim 11, wherein the multiplication means comprises an input to which is applied, as a reference signal, the electrical excitation signal, except for a possible multiplying factor.

17. A device according to claim 11, wherein the reservoir is adapted to be integrated into an equipment having an electrical power supply intended to be connected to a local mains supply, and the low-pass filter has a cut-off frequency below the frequency of this local mains.

18. A device according to claim 11, wherein the product is a marking product, the reservoir is adapted to be integrated into an image forming device, and the frequency of the electrical excitation signal is at least of the order of a megahertz.

19. A device according to claim 18, wherein the product is a printing ink and the reservoir is adapted to be integrated into a printing device.

20. A device according to claim 19, wherein the frequency of the electrical excitation signal is of the order of 5 MHz.

21. A product supply device comprising a reservoir made of electrically non-conductive material and comprising a storage chamber containing an electrically conductive product and a consumption monitoring device, said consumption monitoring device comprising:

means for forming with the storage chamber a capacitive arrangement;

excitation means for applying an electrical excitation signal to that capacitive arrangement and measurement means for taking an output signal from this capacitive arrangement and supplying a measurement signal, this electrical excitation signal having a frequency chosen so that this measurement signal has a characteristic whose amplitude varies substantially with the quantity of product contained in this chamber;

filtering means having means for multiplying the measurement signal by a reference signal having a frequency at least approximately equal to the frequency of the electrical excitation signal, and a low-pass filter with a cut-off frequency greater than the difference between the frequencies of the excitation signal and the reference signal, this low-pass filter being connected to an output of the multiplication means and delivering a filter signal; and processing means arranged so as to determine, in the filtered signal, the value of the amplitude of a characteristic of the same kind as the said characteristic of the measurement signal, and to deduce the value of an information representing the quantity of product available in the reservoir chamber from said value of this amplitude.

22. An image forming device comprising a reservoir made of electrically non-conductive material comprising a storage chamber containing an electrically conductive marking product and a consumption monitoring device, said consumption monitoring device comprising:

means for forming with the storage chamber a capacitive arrangement;

excitation means for applying an electrical excitation signal to that capacitive arrangement and measurement means for taking an output signal from this capacitive arrangement and supplying a measurement signal, this electrical excitation signal having a frequency chose so that this measurement signal has a characteristic whose amplitude varies substantially with the quantity of product contained in this chamber;

filtering means having means for multiplying the measurement signal by a reference signal having a frequency at least approximately equal to the frequency of the electrical excitation signal, and a low-pass filter with a cut-off frequency greater than the difference between the frequencies of the excitation signal and the reference signal, this low-pass filter being connected to an output of the multiplication means and delivering a filtered signal; and processing means arranged so as to determine, in the filtered signal, the value of the amplitude of a characteristic of the same kind as the said characteristic of the measurement signal, and to deduce the value of an information representing the quantity of product available in the reservoir chamber from the said value of this amplitude.

23. A printing device comprising an electrically non-conductive reservoir comprising a storage chamber containing an electrically conductive ink and a consumption monitoring device, said consumption monitoring device comprising:

means for forming with the storage chamber a capacitive arrangement;

excitation means for applying an electrical signal to that capacitive arrangement and measurement means for taking an output signal from this capacitive arrangement and supplying a measurement signal, this electrical excitation signal having a frequency chosen so that this measurement signal has a characteristic whose amplitude varies substantially with the quantity of product contained in this chamber;

filtering means having means for multiplying the measurement signal by a reference signal having a frequency at least approximately equal to the frequency of the electrical excitation signal, and a low-pass filter with a cut-off frequency greater than the difference between the frequencies of the excitation signal and the reference signal, this low-pass filter being connected to an output of the multiplication means and delivering a filtered signal; and processing means arranged so as to determine, in the filtered signal, the value of the amplitude of a characteristic of the same kind as the said characteristic of the measurement signal, and to deduce the value of an information representing the quantity of product available in the reservoir chamber from the said value of this amplitude.

24. An automated office equipment comprising a printing device according to claim 23.

* * * * *

UNITED STATES PATENT AND TRADEMARK OFFICE
CERTIFICATE OF CORRECTION

PATENT NO. : 6,293,144 B1
DATED : September 25, 2001
INVENTOR(S) : Marie-Helene Froger et al.

It is certified that error appears in the above-identified patent and that said Letters Patent is hereby corrected as shown below:

Column 6,
Line 44, change "2f2" to -- 2f0 --; and
Line 54, change "centred" to -- centered --.

Column 8,
Line 5, change "retained." to -- retained). --.

Column 9,
Line 47, change "the" to -- wherein the --; and
Line 52, change "are" to -- is --.

Column 10,
Line 47, change "chose" to -- chosen --.

Signed and Sealed this

Twelfth Day of March, 2002

*Attest:*

*Attesting Officer*

JAMES E. ROGAN
*Director of the United States Patent and Trademark Office*